Figure 1:
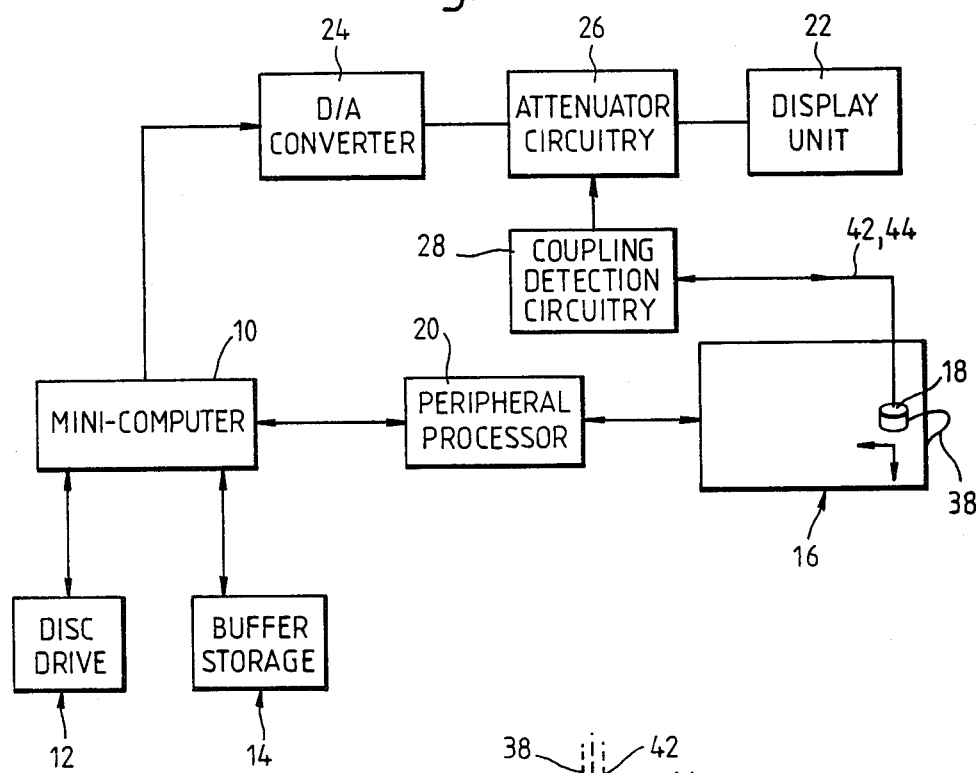

United States Patent [19]

Stoor et al.

[11] Patent Number: 4,867,168

[45] Date of Patent: Sep. 19, 1989

[54] APPARATUS FOR SIMULATING INSPECTION EQUIPMENT

[75] Inventors: Phillip G. J. Stoor, Lymm; Peter G. Bentley, Dorchester; Francis G. Latham, Warrington, all of United Kingdom

[73] Assignee: The Secretary of State for the United Kingdom Atomic Energy Authority in Her Britannic Majesty's Government of the United Kingdom of Great Britain and Northern Ireland, London, England

[21] Appl. No.: 229,634

[22] Filed: Aug. 8, 1988

[51] Int. Cl.[4] .......................... A61B 8/00; G09B 23/28
[52] U.S. Cl. ................................ 128/653; 128/660.01; 434/262; 364/578
[58] Field of Search ............................ 128/653, 660.01; 364/413.13, 413.25, 578; 73/1 DV; 434/262, 267

[56] References Cited

U.S. PATENT DOCUMENTS 3,975,939 8/1976 McLean ............................. 73/596 X
4,360,345 11/1982 Hon ..................................... 434/262
4,470,304 9/1984 Nusbickel, Jr. et al. ..... 73/1 DV X
4,554,926 11/1985 Shirasaka ....................... 128/661.09
4,694,680 9/1987 Takeuchi et al. .......... 128/660.01 X Primary Examiner—Francis Jaworski
Attorney, Agent, or Firm—William R. Hinds

[57] ABSTRACT

Apparatus for simulating inspection equipment, e.g. ultrasonic NDT equipment or ultrasonic medical diagnostics equipment, comprises a test body, a simulated probe for scanning over the body, a probe position monitor, inspection data storage, a display and a central processor for correlating display of the inspection data with scanning movement of the probe. The inspection data is derived from non-simulated scanning of for example a structure containing defects and the ultrasonic waveforms obtained during such non-simulated scanning may be stored in memory for providing a realistic display during simulated scanning of the test body. The simulated probe may incorporate an ultrasonic device for the purpose of sensing the degree of coupling between the simulated transducer and the test body and the output of the device may be used to modify the inspection data to provide a displayed signal which is dependent on the coupling achieved by the operator.

8 Claims, 1 Drawing Sheet

APPARATUS FOR SIMULATING INSPECTION EQUIPMENT

This invention relates to apparatus for simulating inspection equipment, e.g. for the purpose of training personnel in non-destructive testing (NDT) techniques such as ultrasonic inspection or medical diagnostics using ultrasonics techniques.

At present, NDT training is carried out with the aid of test blocks having artificially implanted defects and NDT trainees carry out scanning, e.g. with a conventional ultrasonic probe which may be operated manually or automatically. This suffers from a number of drawbacks in that: such test blocks are expensive to produce and tend to be relatively immobile so that trainees have to attend wherever the test block happens to be located; additional test blocks may need to be produced in order to offer a reasonably wide range of training experience; the security of the test block may be compromised in the sense that details of defects and locations may be passed to trainees in advance of a testing session; and only defects capable of being manufactured can be implanted.

One object of the present invention is to provide apparatus for simulating NDT equipment which avoids the use of test blocks with artificially implanted defects.

According to one aspect of the present invention there is provided apparatus for simulating inspection equipment comprising a simulated test body, a simulated transducer which can be scanned manually or automatically under the control of an operator over said simulated body, means for monitoring the position co-ordinates of the simulated transducer during such scanning, storing means comprising non-volatile memory for digitally storing, for each of a range of possible positions of said simulated transducer, inspection data representative of such data obtained in the course of non-simulated scanning of a non-simulated body, means for selectively effecting loading of a volatile memory with part of the inspection data from the non-volatile memory in dependence upon the instantaneous position of the simulated transducer, and means responsive to said monitoring means for retrieving from said volatile memory inspection data corresponding to the positional co-ordinates of the simulated transducer whereby scanning of the simulated transducer over the simulated body is accompanied by the production of inspection data correlated with the scanning movement.

The retrieved inspection data may be transferred to display means for viewing by an operator.

In this manner, in the case of NDT inspection the operator is given the impression of carrying out a real time NDT examination of a substantial defect-containing structure even though in reality the simulated test body may merely consist of thin stainless steel plate material which may be fabricated to give the appearance of a substantial structure.

In an alternative application, the retrieved inspection data may be fed to data gathering equipment.

The simulated transducer may resemble, or be constituted by, a conventional transducer (e.g. an ultrasonic transducer) although it will be understood that where an actual transducer is employed it will not be operational in the conventional sense but will merely be provided to give the operator a realistic impression of performing an inspection.

In one embodiment of the invention, the monitoring means may include a digitising tablet as used in for example computer aided draughting, the digitising tablet being incorporated in the simulated test block, for example underneath the stainless steel plate described above. The simulated transducer in this event may include an electrical coil inductively coupled through the stainless steel plate to the digitising tablet and the latter may provide an output representing the coil position in XY co-ordinates.

The non-volatile memory may comprise a magnetic disc or tape. The volatile memory, such as semi-conductor random access memory, may be loaded with the inspection data corresponding to a range of positions around the "instantaneous" position of the simulated transducer and is updated in response to each new position of the simulated transducer registered by the monitoring means. Transfer of the inspection data from the volatile memory to the display means or data gathering equipment may be effected by a central processor and the monitoring means may be constituted by a peripheral processor so that time delays in determining the "instantaneous" position of the simulated transducer can be minimised.

According to a second aspect of the invention there is provided apparatus for simulating inspection equipment comprising a simulated test body, a simulated transducer which can be scanned manually or automatically under the control of an operator over said simulated body, means for monitoring the position co-ordinates of the simulated transducer during such scanning, means for digitally storing for each of a range of possible positions of said simulated transducer, inspection data representative of such data obtained in the course of non-simulated scanning of a non-simulated body, means responsive to said monitoring means for retrieving from said storing means inspection data corresponding to the positional co-ordinates of the simulated transducer whereby scanning of the simulated transducer over the simulated body is accompanied by the production of inspection data correlated with the scanning movement, and means responsive to the degree of coupling between the simulated transducer and the test body for modifying the retrieved inspection data.

Preferably, the apparatus includes digital to analogue conversion means for translating the retrieved digital inspection data into analogue signals and means for visually displaying the analogue signals, said modifying means being arranged to vary the amplitude of said analogue signals in dependence upon said degree of coupling.

Conveniently, said modifying means comprises a stress wave generator and stress wave carrier incorporated in said simulated transducer, the stress wave carrier having an end face which is spaced from the generator and is substantially flush with, or constitutes a surface which, in use, is intended to contact said test body, the stress wave generator being operable to launch stress wave pulses into the carrier for reflection at the end face of the carrier whereby the strength of the reflected signal provides an indication of the effectiveness of contact between the simulated transducer and the simulated test body.

Figure 2:
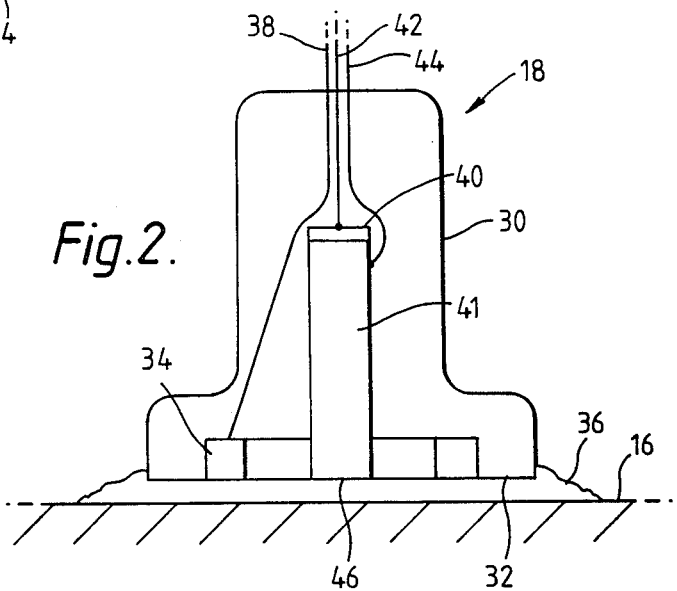

To promote further understanding of the invention an embodiment will now be described by way of example only with reference to the accompanying drawing in which:

FIG. 1 is a schematic block diagram illustrating simulating apparatus in accordance with the invention; and FIG. 2 is a diagrammatic sectional view of the "transducer"

Referring now to FIG. 1, the system for simulating for example ultrasonic non-destructive testing comprises a mini-computer 10 coupled with a disc drive 12 and buffer storage 14. The disc drive 12 is loaded with a disc containing all the software for the system together with ultrasonic defect data. The defect data is transferable from the disc to the buffer storage 14 for rapid access by the mini-computer, as explained below.

The defect data is derived from non-simulated NDT ultrasonic scanning of a specimen or specimens known to contain defects. The specimen(s) may be deliberately manufactured with implanted defects or may be a structure for which a "real-life" ultrasonic NDT examination has been recorded. Typically, the defect data will consist of a large number of digitised ultrasonic waveforms and their corresponding position co-ordinates.

The test block is simulated by a stainless steel plate 16 beneath which is located a high resolution digitising tablet of the type used in computer-aided draughting. The simulated transducer 18 is movable over the surface of the plate 16 and incorporates a coil 34 (see FIG. 2) inductively coupled with the digitising tablet so that the latter can provide an output in digital form representing the positional co-ordinates of the simulated transducer 18 at any instant. This output is monitored by a peripheral processor 20 and put into a form suitable for access within the software routines of the mini-computer 10. Since this is done independently of the mini-computer, no time delay occurs when the mini-computer requests data relating to the position of the simulated transducers.

During scanning of the simulated test block, the mini-computer 10 as part of its program cycle repeatedly interrogates the peripheral processor to obtain the current positional data for the simulated transducer 10 and, using that data, then retrieves from the corresponding ultrasonic waveform either directly from the buffer storage 14 if already available or from the disc via the buffer storage. The digitised waveform data is transferred to a display 22, such as a conventional flaw detector display, via attenuator circuitry 26 (to be described later) and a function generator 24 which converts the digitised data into analogue form to provide a reconstructed waveform on the display which may be indistinguishable from the waveform that an operator would expect to see on observing an actual defect embedded in a steel test block or, on-site, in a manufactured item such as a pressure vessel.

The mini-computer 10 is programmed so that, on obtaining positional data from the peripheral processor 20, the buffer storage 14 is loaded with the waveform corresponding to that particular positional data (if not already available in the buffer storage) and also the waveforms corresponding to a limited range of positions surrounding the current position of the simulated transducer 18. In this way, the waveform data for subsequent displacement of the simulated transducer within that limited range is immediately available from the buffer storage thereby avoiding delay in reading waveform data from disc to the buffer storage. Even when the buffer storage 14 already contains the required waveform data for a new position of the transducer, the buffer storage may be updated with waveform data corresponding to a predetermined range of positions centred on the new position.

The function of the attenuator circuitry 26 is to modify the analogue signals applied by the D/A converter 24 to the display 22 so that the displayed signal strength is varied in dependence upon the electromechanical coupling between the simulated transducer 18 and the specimen 16, as detected by coupling detection circuitry 28.

Referring to FIG. 2, the simulated probe 18 comprises a housing 30 which accommodates the coil 34 energised via lead 38 and which, in terms of outward appearance, may closely resemble the appearance of a conventional fully functional ultrasonic transducer. The housing 30 has a contact face 32 which, in use, is contacted with the surface of the specimen 16 through a conventional ultrasonic couplant gel 36 so that good electromechanical coupling can be achieved. However, it will be understood that for simulation purposes it is not necessary for there to be good electromechanical coupling because there is no actual transmission of ultrasonic energy into the specimen 16 for the purpose of testing the specimen. Nevertheless, it is desirable that use of the simulating apparatus should closely mirror use of real equipment so that, if the operator fails to secure good electromechanical coupling, the results obtained are correspondingly degraded. To this end, the apparatus includes means for sensing the extent of electromechanical coupling between the transducer 18 and the specimen 16.

In the illustrated embodiment, the sensing means comprises an ultrasonic signal generator, e.g. a piezoelectric crystal 40, bonded to a coupling bar 41 which may be of metal, preferably having an acoustic impedance close to that of the specimen 16. Coupling detection circuitry 28 includes a pulse generator for electrically pulsing the crystal 40 via lead 42 whereby pulsed ultrasound is launched into the coupling bar 42. The ultrasound pulses are reflected at the end face 46 of the coupling bar 41, the end face being substantially flush with the contact face 32 of the housing 30. If the end face 44 is not well coupled with the specimen then a strong reflected signal is obtained but as the degree of coupling increases, ultrasonic energy is lost from the bar 41 into the specimen. By pulsing the bar 41 at a frequency which gives resonant conditions of the bar/crystal combination, a reflected signal can be picked up, via lead 44, which has an amplitude which is reproducible and is a function of the distance of the fully-gelled end face 46 from the surface of specimen 16. In practice, at conventional frequencies used in ultrasound testing, e.g. 1 MHz and above, this function tends to be frequency-dependent and complex because of interference effects in the couplant gel film. It has been found that, by operating at lower frequencies, e.g. of the order 250 KHz, these frequency-dependent effects can be reduced or avoided without reduction in the skill required on the part of the operator to maintain good electromechanical coupling.

The reflected signals received by detection circuitry 28 are translated into a control voltage which represents the degree of coupling and is applied to voltage-controlled attenuator 26 which attenuates the analogue signals from the D/A converter 24 to a greater or lesser extent depending on the quality of coupling achieved. In this way, the output of the display 22 reflects the quality of the coupling achieved and the operator can, by appropriate manipulation of the transducer while observing the display, check whether or not he is achieving satisfactory coupling.

From the foregoing it will be seen that the system as described above affords the following advantages:

a. Real data from real flaws is used to generate the waveforms presented to the inspection equipment and/or inspector. These can come from:
   1. Deliberately introduced defects in test blocks.
   2. Real defects that may exist due to manufacturing in the type of structure to be encountered by test personnel.
   3. Predicted defects that cannot yet be artificially manufactured, but are known to be possible. It is envisaged that theoretical modelling work could supply the data such that these defects may be experienced by inspectors or their test equipment before they are encountered in practice.

b. The data is repeatable and accurate since the waveforms are recalled from memory without distortion or degradation. The data may be copied or transmitted to other test facilities where simulator systems exist. No differences will exist between the data presented to inspectors and test equipment in the various locations and therefore comparisons and standards will be maintained over large distances in dispersed training and validation sites.

c. The system is quickly disassembled for transport to other locations, and the waveform data may be transmitted over electronic links between sites and countries. This is not the case at present with very large test blocks.

d. The system is cheaper than using test blocks and can take the place of many test blocks since it is so easily re-configured.

e. The security of the system relies upon the fact that an inspector cannot know from one session to another where the simulator programmer has placed a defect, either in orientation, position, depth or what type it is. This is not the case with test blocks, since if the location of defects are known or passed on to third parties the security of that test block is compromised.

Although the invention is described above in relation to NDT of defect-containing structures, the invention also has application to medical inspection techniques using for example ultrasonics. In this instance, the test body may be contoured to simulate for example the trunk of a human body and a probe is used to scan over the simulated trunk, means being provided to monitor the position of the probe (e.g. in 3 dimensions). In this case, pre-recorded inspection data obtained from ultrasonic inspection of a living human body may be stored digitally by means of a laser-readable optical disc and the stored data may be retrieved in dependence upon the "instantaneous" position of the probe relative to the simulated trunk and processed to produce a C-scan display which will change as a probe moves across the trunk. The optical disc may be used in conjunction with volatile memory so that at any instant the memory is loaded with inspection data associated with the current position of the probe and, in addition, data associated with a range of positions lying within a zone around the current probe position.

We claim:

1. Apparatus for simulating inspection equipment comprising a simulated test body, a simulated transducer which can be scanned manually or automatically under the control of an operator over said simulated body, means for monitoring the position co-ordinates of the simulated transducer during such scanning, storing means comprising non-volatile memory for digitally storing, for each of a range of possible positions of the simulated transducer, inspection data representative of such data obtained in the course of non-simulated scanning of a non-simulated body, means for selectively effecting loading of a volatile memory with part of the inspection data from the non-volatile memory in dependence upon the instantaneous position of the simulated transducer, and means responsive to said monitoring means for retrieving from said volatile memory inspection data corresponding to the positional co-ordinates of the simulated transducer whereby scanning of the simulated transducer over the simulated body is accompanied by the production of inspection data correlated with the scanning movement.

2. Apparatus as claimed in claim 1 in which said loading means is operable to effect loading of the volatile memory with inspection data associated with a range of positions around said instantaneous position.

3. Apparatus as claimed in claim 2 including means responsive to the degree of coupling between the simulated transducer and the test body for modifying the retrieved inspection data.

4. Apparatus as claimed in claim 3, including digital to analogue conversion means for translating the retrieved digital inspection data into analogue signals, and means for visually displaying the analogue signals, said modifying means being arranged to vary the amplitude of said analogue signals in dependence upon said degree of coupling.

5. Apparatus as claimed in claim 3, in which said modifying means comprises a stress wave generator and stress wave carrier incorporated in said simulated transducer, the stress wave carrier having an end face which is spaced from the generator and is substantially flush with, or constitutes a surface which, in use, is intended to contact said test body, the stress wave generator being operable to launch stress wave pulses into the carrier for reflection at the end face of the carrier whereby the strength of the reflected signal provides an indication of the effectiveness of contact between the simulated transducer and the simulated test body.

6. Apparatus as claimed in claim 3, in which the simulated test body is contoured to simulate part of a human body.

7. Apparatus for simulating inspection equipment comprising a simulated test body, a simulated transducer which can be scanned manually or automatically under the control of an operator over said simulated body, means for monitoring the position co-ordinates of the simulated transducer during such scanning, means for digitally storing for each of a range of possible positions of said simulated transducer inspection data representative of such data obtained in the course of non-simulated scanning of a non-simulated body, means responsive to said monitoring means for retrieving from said storing means inspection data corresponding to the positional co-ordinates of the simulated transducer whereby scanning of the simulated transducer over the simulated body is accompanied by the production of inspection data correlated with the scanning movement, means responsive to the degree of coupling between the simulated transducer and the test body for modifying the retrieved inspection data, digital to analogue conversion means for translating the retrieved digital inspection data into analogue signals, means for visually displaying the analogue signals, said modifying means being arranged to vary the amplitude of said analogue signals in dependence upon said degree of coupling and comprising a stress wave generator and stress wave carrier incorporated in said simulated transducer, the stress wave carrier having an end face which is spaced from the generator and is substantially flush with, or constitutes a surface which, in use, is intended to contact said test body, the stress wave generator being operable to launch stress wave pulses into the carrier for reflection at the end face of the carrier whereby the strength of the reflected signal provides an indication of the effectiveness of contact between the simulated transducer and the simulated test body.

8. Apparatus as claimed in claim 7, in which the simulated body is contoured to simulate part of a human body.

* * * * *

UNITED STATES PATENT AND TRADEMARK OFFICE
CERTIFICATE OF CORRECTION

PATENT NO. : 4,867,168

DATED : September 19, 1989

INVENTOR(S) : Phillip G. J. Stoor; Peter G. Bentley; and Francis G. Latham

It is certified that error appears in the above—identified patent and that said Letters Patent is hereby corrected as shown below:

On the first page of the printed patent, the information page, the name of the assignee is corrected as follows:

--UNITED KINGDOM ATOMIC ENERGY AUTHORITY--.

Signed and Sealed this

Twenty-seventh Day of November, 1990

Attest:

HARRY F. MANBECK, JR.

Attesting Officer

Commissioner of Patents and Trademarks